United States Patent
Xiao et al.

(10) Patent No.: US 9,790,849 B2
(45) Date of Patent: Oct. 17, 2017

(54) METHOD AND SYSTEM TO OPERATE A COMPRESSOR FOR AN ENGINE

(71) Applicant: Ford Global Technologies, LLC, Dearborn, MI (US)

(72) Inventors: Baitao Xiao, Canton, MI (US); Hamid-Reza Ossareh, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 14/844,606

(22) Filed: Sep. 3, 2015

(65) Prior Publication Data

US 2017/0067393 A1 Mar. 9, 2017

(51) Int. Cl.
*F02B 37/04* (2006.01)
*F02D 41/00* (2006.01)
*F02B 37/14* (2006.01)
*F02B 39/10* (2006.01)

(52) U.S. Cl.
CPC .............. *F02B 37/04* (2013.01); *F02B 37/14* (2013.01); *F02B 39/10* (2013.01); *F02D 41/0005* (2013.01); *F02D 41/0007* (2013.01)

(58) Field of Classification Search
CPC .......... F02B 37/04; F02B 37/14; F02B 39/10; F02D 41/0005; F02D 41/0007
See application file for complete search history.

(56) References Cited

U.S. PATENT DOCUMENTS

| | | | |
|---|---|---|---|
| 7,921,944 B2 | 4/2011 | Russell et al. | |
| 8,210,292 B2 | 7/2012 | Russell et al. | |
| 2008/0175703 A1 | 7/2008 | Lugg | |
| 2014/0053547 A1* | 2/2014 | Wade | F02C 9/18 60/599 |
| 2016/0061104 A1* | 3/2016 | Hirayama | F02B 37/04 60/602 |
| 2017/0016388 A1* | 1/2017 | Xiao | F02B 37/14 |
| 2017/0016389 A1* | 1/2017 | Xiao | F02B 37/14 |
| 2017/0030259 A1* | 2/2017 | Tabata | F02B 37/14 |
| 2017/0044971 A1* | 2/2017 | Racca | F02B 37/14 |
| 2017/0051659 A1* | 2/2017 | Banker | F02B 37/14 |
| 2017/0122241 A1* | 5/2017 | Xiao | F02D 41/0007 |

* cited by examiner

Primary Examiner — Mary A Davis
(74) Attorney, Agent, or Firm — Julia Voutyras; McCoy Russell LLP (57) ABSTRACT

Methods and systems for operating an engine that includes two compressors is disclosed. In one example, an electrically driven compressor is activated in response to conditions where a turbocharger compressor speed oscillates. The electrically driven compressor is activated to cancel engine air intake flow oscillations that may be caused by the turbocharger compressor.

19 Claims, 4 Drawing Sheets

METHOD AND SYSTEM TO OPERATE A COMPRESSOR FOR AN ENGINE

BACKGROUND/SUMMARY

A turbocharger may compress air supplied to an engine to improve engine performance. Speed of a turbocharger may be controlled via a waste gate. The waste gate may be selectively opened and closed to regulate compressor speed. Nevertheless, a turbocharger compressor may be prone to oscillate if a large change in flow through the compressor occurs. For example, a compressor may begin to oscillate if a driver at least partially releases an accelerator pedal from a higher driver demand to a lower driver demand. Quickly closing the throttle may cause air flowing through the compressor to decrease so that the compressor begins to oscillate. One way to reduce the possibility of compressor oscillation is to install a compressor bypass valve that allows air to return to the compressor's inlet from the compressor's outlet. However, the energy applied to pressurize the air is lost and not recoverable when the compressor bypass valve is opened. Further, if the driver applies the accelerator pedal after air pressure downstream of the compressor is reduced; the turbocharger may not be able to provide a desired engine air flow. Consequently, the driver may experience "turbocharger lag" (e.g., a delay in engine torque production due at least in part to air flow through the turbocharger being lower than is desired) until air flow through the turbocharger is sufficient to provide the desired engine air flow. Therefore, it may be desirable to provide a way of reducing compressor oscillation while not releasing boost or contributing to the possibility of turbocharger lag.

The inventors herein have recognized the above-mentioned disadvantages and have developed a method for operating engine compressors, comprising: receiving sensor data to a controller; and activating a second compressor in an engine intake via the controller in response to a first compressor being within a threshold air flow of a surge condition based on the sensor data.

By activating a second compressor in an engine air inlet passage, it may be possible to provide the technical result of adjusting air pressure in the engine air inlet upstream of the first compressor so that the possibility of speed oscillations of the first compressor may be reduced. In one example, air flow through the second compressor is adjusted to decrease pressure at an outlet of the second compressor in response to a pressure increase at an outlet of the first compressor. In this way, boost produced by the first compressor may be conserved so that if a driver increases a demand torque, air may be available to increase engine power with little or no turbocharger lag.

The present description may provide several advantages. For example, the approach may conserve boost provided by a turbocharger. Further, the approach may improve engine air fuel control via reducing pressure oscillations in the engine intake passage. Further still, the approach may provide quick access to boost pressure after a driver reduces a driver demand torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
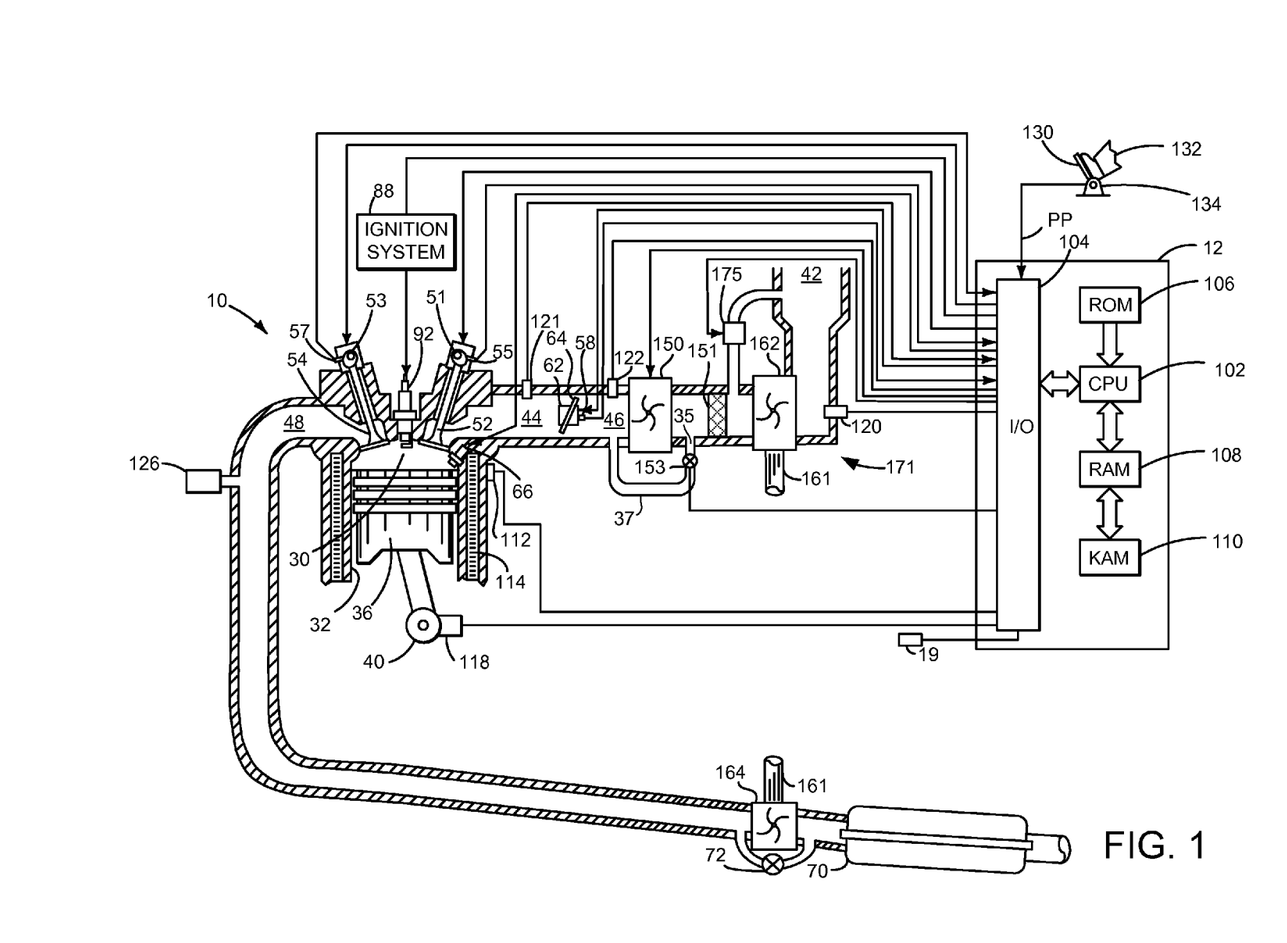
FIG. 1 shows a schematic depiction of an engine.
Figure 3:
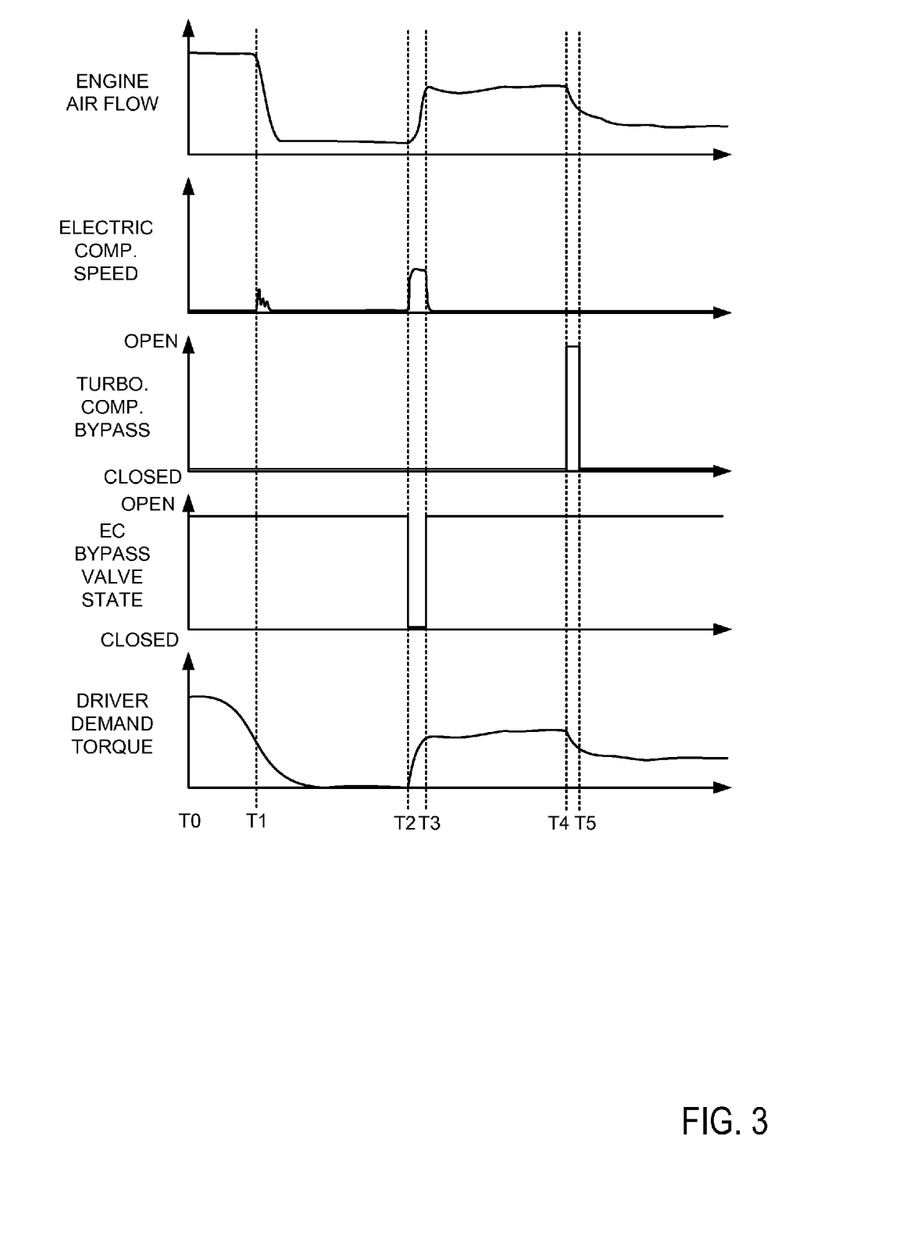
FIG. 3 shows an example engine operating sequence for reducing the possibility of compressor surge.
Figure 4:
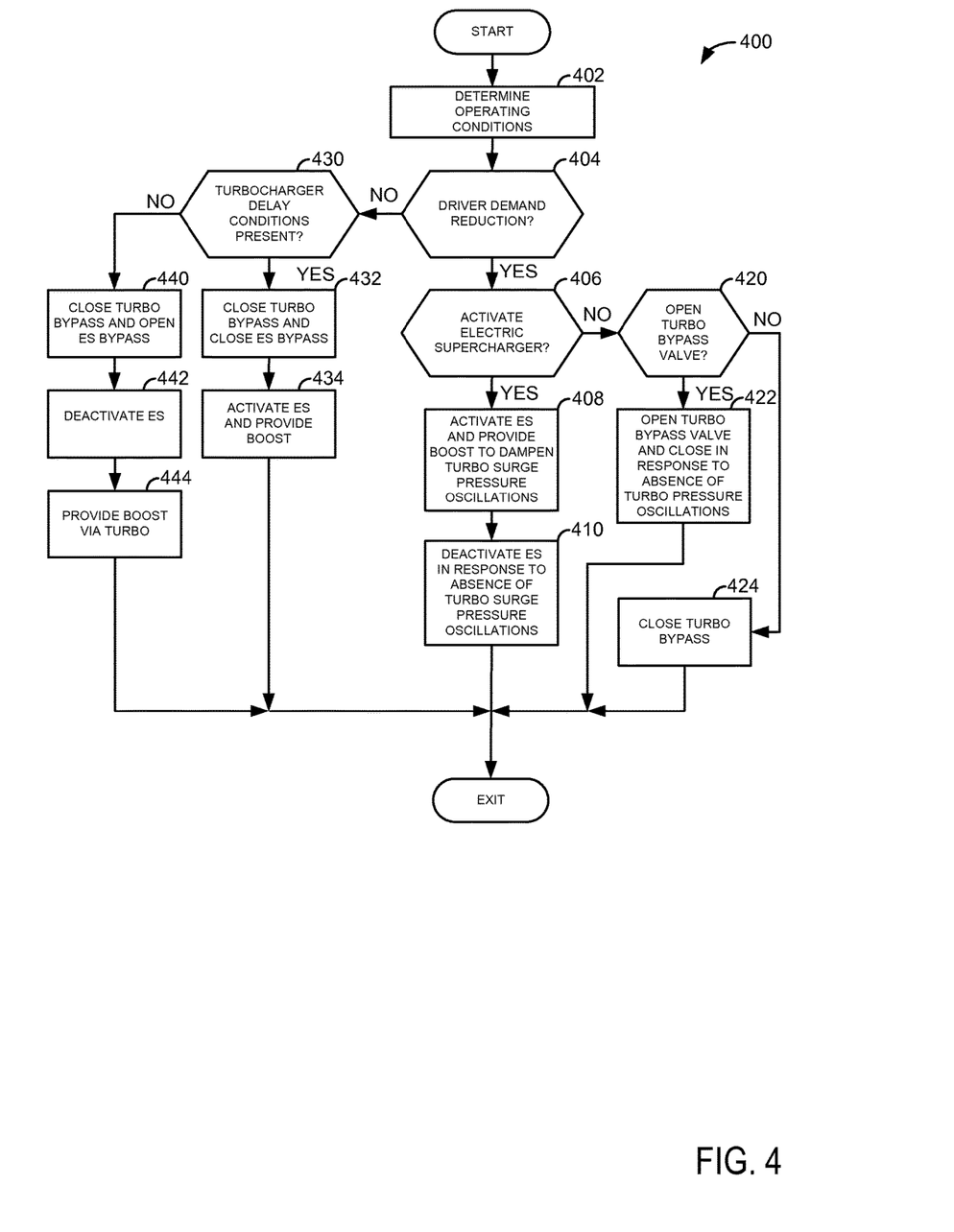
FIG. 4 shows an example method for reducing the possibility of compressor surge.

The present description is related to operating an engine that includes a turbocharger compressor. The turbocharger compressor may experience oscillations in speed if exposed to particular pressure ratios and flow conditions. FIG. 1 shows an example engine including two compressors. Pressure oscillations in the engine air intake may be reduced by operating an electrically driven compressor in an arrangement shown in FIG. 2. An example engine operating sequence for controlling pressure and flow within an engine air intake is shown in FIG. 3. A method for operating an engine and reducing the possibility of compressor surge is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided from controller 12. Fuel is delivered to fuel injector 66 by a fuel system including a fuel tank (not shown), fuel pump (not shown), and fuel rail (not shown). In addition, intake manifold 44 is shown communicating with optional electronic throttle 62 which adjusts a position of throttle plate 64 to control air flow from intake boost chamber 46.

Compressor 162 draws air from engine air inlet 42 to supply boost chamber 46. Exhaust gases spin turbine 164 which is coupled to compressor 162 via shaft 161. Exhaust driven compressor bypass valve 175 may be electrically operated via a signal from controller 12. Compressor bypass valve 175 allows pressurized air to be circulated back to the compressor inlet to limit boost pressure. Similarly, waste gate actuator 72 allows exhaust gases to bypass turbine 164 so that boost pressure can be controlled under varying operating conditions.

Electrically driven compressor 150 may be selectively activated via controller 12. Electrical energy from an electric energy storage devices and/or an alternator (not shown)

supplies energy to rotate electrically driven compressor 150. Electrically driven compressor bypass passage 37 includes an electrically driven compressor bypass valve 153 that may be selectively opened to allow air to flow from compressor 162 through charge air cooler 151 and to boost chamber 46 without passing through electrically driven compressor 150. Charge air cooler 151 cools air entering engine air intake 171. Charge air cooler 151 may be an air-to-air cooler or a liquid-to-air cooler.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transitory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; ambient air humidity from humidity sensor 19; a measurement of engine manifold pressure (MAP) from pressure sensor 121 coupled to intake manifold 44; a measurement of boost pressure or throttle inlet pressure from pressure sensor 122 coupled to boost chamber 46, or alternatively, upstream of electrically driven compressor 150; an engine position sensor from a Hall effect sensor 118 sensing crankshaft 40 position; a measurement of air mass entering the engine from sensor 120 (e.g., a hot wire air flow meter); and a measurement of throttle position from sensor 58. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Air flows through the engine from engine air inlet 42 past compressor 162, charge air cooler 151, electrically drive compressor 150, and throttle 62 before entering engine intake manifold 44. Air enters combustion chamber 30 from engine intake manifold 44 before proceeding to exhaust manifold 48 as combustion byproducts or air. Air and/or combustion byproducts are then released to atmosphere after passing turbine 164 and passing through converter 70. Thus, engine air inlet 42 is upstream of compressor 162, charge air cooler 151, electrically driven compressor 150, and combustion chamber 30 according to a direction of air flow through engine 10.

Figure 2:
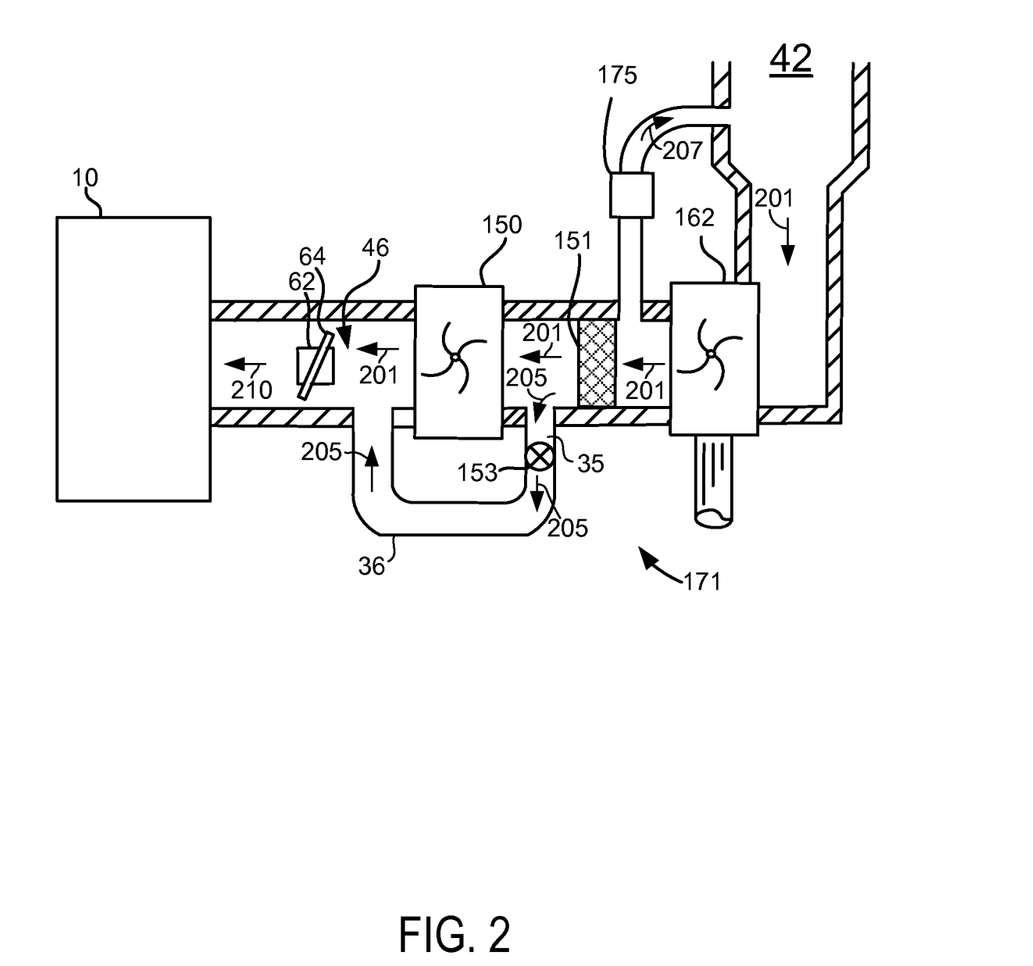
FIG. 2 shows a schematic illustrating engine air flow according to the present description.

Referring now to FIG. 2, a schematic illustrating engine air flow according to one aspect of the present description is shown. FIG. 2 shows air flow in engine components shown in FIG. 1. Elements shown in FIG. 2 that are labeled with the same numeric values shown in FIG. 1 are the same elements shown in FIG. 1. Further, the elements function in the same way. Therefore, for the sake of brevity, a description of these elements is omitted.

During engine operating conditions where turbocharger lag may be present, valve 153 may be closed so that air flows from compressor 162 to electrically driven compressor 150 before passing electronic throttle 62. Air flows through engine intake 171 in the direction shown by arrows 201 when valve 153 is closed. Valve 153 may be opened and electrically driven compressor 150 deactivated when compressor 162 may provide air flow at or greater than a desired engine air flow. Air flows through engine intake 171 in the direction shown by arrows 205 when valve 153 is open and electrically driven compressor is deactivated. Air flow may be in a direction opposite to that shown by arrows 205 when electrically driven compressor 150 is active and valve 153 is open. Air flows into engine 10 as shown by arrow 210. Air may flow into engine 10 when valve 153 is open or closed.

The speed of electrically driven compressor 150 may be varied to increase or decrease pressure in boost chamber 46 and increase or decrease pressure between electrically driven compressor and charge air cooler 151. In particular, pressure in boost chamber 46 may be increased when speed of electrically driven compressor 150 is increased. Pressure between electrically driven compressor 150 and charge air cooler may decrease when speed of electrically driven compressor 150 is increased. Conversely, pressure in boost chamber 46 may be decrease from a higher pressure when speed of electrically driven compressor 150 is decreased due to the engine consuming air. Pressure between electrically driven compressor 150 and charge air cooler may increase when speed of electrically driven compressor 150 is decreased.

Air flow may be in a direction shown by arrow 207 when compressor bypass valve 175 is opened. Bypass valve 175 may be opened when compressor 162 approaches surge conditions (e.g., operating at a low flow rate and mid to high pressure ratio across compressor 162).

Thus, the system of FIGS. 1 and 2 provides for an engine system, comprising: an engine including an air intake; an exhaust gas driven compressor positioned along the air intake and including a bypass valve; an electrically driven compressor posited along the air intake downstream of the exhaust gas driven compressor; and a controller including non-transitory instructions to open the bypass valve in response to a first indication of impending surge of the exhaust gas driven compressor and to activate the electrically driven compressor while the bypass valve is closed in response to a second indication of impending surge of the exhaust gas driven compressor. The indication of impending surge may be an increasing pressure ratio across the turbocharger compressor and/or a reduction of air flow through the compressor turbine that move turbocharger compressor operation closer to a surge line of a compressor map stored in controller memory.

In some examples, the engine system includes where the first indication of impending surge occurs at a first turbocharger compressor flow that is less than a second turbocharger compressor flow where the second indication of impending surge occurs. The engine system further comprises additional non-transitory instructions to adjust air flow through the electrically driven compressor in response to the second indication of impending surge. The engine system includes where adjusting air flow through the electrically driven compressor includes commanding air flow through the electrically driven compressor based on pressure or air flow data provided via a sensor. The engine system includes where the second compressor is activated from a deactivated state. The engine system includes where the first and second indications of impending surge are based on an expected speed oscillation of the exhaust gas driven compressor.

Referring now to FIG. 3, a prophetic engine operating sequence is shown. The engine operating sequence may be provided by the system of FIG. 1 according to the method of FIG. 4. Vertical lines shown at T0-T5 represent times of particular interest in the sequence. The plots are time aligned and occur at a same time.

The first plot from the top of FIG. 3 is a plot of engine air flow versus time. The vertical axis represents engine air flow and engine air flow increases in the direction of the vertical axis arrow. The horizontal axis represents time and time increases from the left side of the plot to the right side of the plot.

The second plot from the top of FIG. 3 is a plot of electrically driven compressor speed versus time. The vertical axis represents speed of the electrically driven compressor and speed increases in the direction of the vertical axis arrow. The horizontal axis represents time and time increases from the left side of the plot to the right side of the plot.

The third plot from the top of FIG. 3 is a plot of turbocharger compressor bypass valve position versus time. The turbocharger compressor bypass valve is open when the trace is at a higher level near the vertical axis arrow. The turbocharger bypass valve is closed when the trace is at a lower level near the horizontal axis. The horizontal axis represents time and time increases from the left side of the figure to the right side of the figure.

The fourth plot from the top of FIG. 3 is a plot of electrically driven compressor (EC) bypass valve operating state versus time. The vertical axis represents EC bypass valve operating state. The EC bypass valve is open when the trace is at a higher level near the vertical axis arrow. The EC bypass valve is closed when the trace is at a lower level near the horizontal axis. The horizontal axis represents time and time increases from the left side of the figure to the right side of the figure.

The fifth plot from the top of FIG. 3 is a plot of driver demand torque versus time. The vertical axis represents driver demand torque and driver demand torque increases in the direction of the vertical axis arrow. The horizontal axis represents time and time increases from the left side of the figure to the right side of the figure.

At time T0, the engine air flow is at a higher level and the electrically driven compressor is deactivated. The turbocharger compressor bypass valve is closed and the electrically driven compressor bypass vale is open. The driver demand torque is at a higher level. Such conditions may be indicative of operating the engine while an engine is driving at highway speeds or accelerating.

At time T1, the driver reduces the driver demand torque by at least partially releasing the accelerator pedal. The engine air flow is reduced in response to the reduction in driver demand torque. The electrically driven compressor is activated and its speed is adjusted to provide pressure in the engine intake system that is out of phase with pressure produced via the turbocharger compressor. For example, pressure output of the electrically driven compressor may increase when pressure output of the turbocharger compressor is decreasing. By providing pressure at the electrically driven compressor that is out of phase with pressure produced via the turbocharger compressor, it may be possible to reduce a magnitude of pressure oscillations near the engine throttle. The speed of the electrically driven compressor may be controlled responsive to a pressure in the engine intake, air flow in the engine air intake, or according to an open loop command stored in memory. In this example, the electrically driven compressor bypass valve is shown commanded open, but in other examples, the electrically driven compressor valve may be commanded closed when the electrically driven compressor is activated. Further, the electrically driven compressor may be activated in response to a change in engine air flow (e.g., a decrease) greater than a threshold.

Between time T1 and time T2, the driver demand torque is reduced to a value of near zero and the engine air flow is reduced to a lower level in response to the lower driver demand torque. The electrically driven compressor is deactivated in response to the pressure ratio across the turbocharger compressor and flow rate through the turbocharger compressor not being indicative of turbocharger compressor surge conditions. The turbocharger compressor bypass valve remains closed and the electrically driven compressor bypass valve is remains open.

At time T2, the driver demand torque is increased and the electrically driven compressor bypass valve is closed in response to the increase in driver demand torque. The electrically driven compressor is also activated in response to the increase in driver demand torque. By activating the electrically driven compressor, a delay in engine torque resulting from turbocharger lag may be reduced. The engine air flow also increases in response to activating the electrically driven compressor and the increase in driver demand torque.

At time T3, the engine air flow and flow through the turbocharger reaches a desired engine air flow amount.

Therefore, the electrically driven compressor is deactivated and the electrically driven compressor bypass valve is opened. By opening the electrically driven compressor bypass valve and deactivating the electrically driven compressor, engine air flow may be provided solely via the turbocharger compressor without assistance from the electrically driven compressor. In this way, energy consumed to operate the engine may be reduced.

Between time T2 and time T4, the driver demand torque remains near a middle level and so does the engine air flow. The electrically driven compressor remains deactivated and the turbocharger compressor bypass valve remains closed. The electrically driven compressor bypass remains open.

At time T4, the driver reduces the driver demand torque by at least partially releasing the accelerator pedal. The engine air flow is reduced in response to the reduction in driver demand torque. However, the decrease in driver demand is less than the level at time T1. Further, the change in engine air flow is less than the change in engine air flow at time T1. Therefore, instead of activating the electrically driven compressor, the turbocharger compressor bypass valve is opened. Opening the turbocharger compressor bypass valve reduces the pressure ratio between an inlet and outlet of the turbocharger compressor, thereby reducing the possibility of compressor surge. The electrically driven compressor bypass valve remains open and the electrically driven compressor remains deactivated. Further, less electrical energy may be used to open the turbocharger compressor bypass valve than for activating the electrically driven compressor.

At time T5, the turbocharger compressor bypass valve is closed in response to a lower pressure ratio across the turbocharger compressor and a lower air flow through the turbocharger compressor. The engine air flow remains at a lower middle level and the driver demand torque is also at a lower middle level. The electrically driven compressor bypass valve remains closed and the electrically driven compressor remains deactivated.

In this way, the possibility of turbocharger compressor surge may be reduced. For example, for greater changes in engine air flow, the electrically driven compressor may be activated to adjust pressure within the engine intake and reduce the possibility of turbocharger compressor surge. However, if the change in engine air flow is smaller, the turbocharger compressor bypass valve may be opened so that less electrical energy is consumed as compared to activating the electrically driven compressor.

Referring now to FIG. 4, an example method for operating a turbocharged engine including an electrically driven compressor is shown. At least portions of the method of FIG. 4 may be incorporated to controller 12 in the system of FIG. 1 as executable instructions stored in non-transitory memory. Further, portions of the method of FIG. 4 may be actions taken by controller 12 in the physical world to transform vehicle operating conditions. The method of FIG. 4 may provide the operating sequence shown in FIG. 3.

At 402, method 400 determines vehicle operating conditions including but not limited to driver demand torque, throttle inlet pressure, desired engine air flow, engine speed, ambient humidity, ambient air temperature, and intake air temperature are determined via querying the various sensors shown in FIG. 1. Method 400 proceeds to 404 after operating conditions are determined.

At 404, method 400 judges if there is a reduction in driver demand torque or a change in engine operating conditions that may move engine operating conditions into a region where turbocharger compressor surge may occur. In one example, method 400 may judge that conditions for turbocharger compressor surge are being approached by the turbocharger compressor based on a pressure ratio across the turbocharger compressor and air flow through the turbocharger compressor. For example, method 400 may judge that engine operating conditions indicate that the engine is approaching a surge line of a compressor map. If method 400 judges that there is a decrease in driver demand torque that may cause turbocharger compressor surge or if the turbocharger compressor is approaching turbocharger compressor surge conditions, the answer is yes and method 400 proceeds to 406. Otherwise, the answer is no and method 400 proceeds to 430.

At 406, method 400 judges whether or not to activate the electrically driven compressor or supercharger (ES). In one example, method 400 judges to activate the ES in response to a reduction in engine air flow greater than a first threshold. In other examples, method 400 may judge to activate the ES in response to air flow through the turbocharger compressor and pressure ratio across the turbocharger compressor being within a threshold flow and pressure ratio of a turbocharger compressor surge line. In still other examples, method 400 may activate the ES in response to a decrease in accelerator pedal position greater than a first threshold or other conditions. If method 400 judges to activate the ES, the answer is yes and method 400 proceeds to 408. Otherwise, the answer is not and method 400 proceeds to 420.

At 408, method 400 activates the electrically driven compressor or supercharger (ES) to provide boost and dampen pressure oscillations in the engine intake that may develop from the turbocharger compressor. In one example, the ES speed may be commanded to an open loop speed that is varied in response to time since activation. For example, a desired ES speed may be stored in memory that is indexed by time since a turbocharger surge condition is expected. The ES is commanded the speed stored in memory. In other examples, the ES speed may be closed loop controlled in response to pressure in the engine intake downstream of the turbocharger compressor (e.g., at the throttle inlet or upstream of the ES) or air flow through the turbocharger compressor. For example, ES speed may be increased to increase pressure in the engine intake in response to a decrease in pressure in the engine intake. Alternatively, ES speed may be decreased to decrease pressure in the engine intake in response to an increase in pressure in the engine intake. In this way, pressure output from the ES may be 180 degrees out of phase with pressure produced by the turbocharger compressor so that pressure changes in the engine intake may be reduced. Additionally, the ES speed may be a function of turbocharger compressor bypass position and time since turbocharger surge conditions are determined or expected. For example, if the turbocharger bypass valve is partially open, the turbocharger speed value extracted from memory may be multiplied by a value that is based on turbocharger compressor bypass valve position when the compressor bypass valve is partially open. The ES bypass valve may be open during a first condition and closed during a second condition when the ES speed is being adjusted in response to pressure in the engine intake.

At 410, method 400 deactivates the electrically driven compressor in response to operating conditions indicative of no engine intake pressure oscillations due to turbocharger compressor surge. In one example, the electrically driven compressor may be deactivated in response to turbocharger compressor pressure ratio and air flow being greater than a threshold away from turbocharger surge conditions or a surge line of a turbocharger compressor map. If the turbocharger compressor continues to operate near turbocharger compressor surge conditions, method 400 continues to adjust ES speed at 408. Method 400 proceeds to exit after the ES is deactivated.

At 420, method 400 judges whether or not to open a turbocharger compressor bypass valve. In one example, method 400 judges to open the turbocharger compressor bypass valve in response to a reduction in turbocharger compressor air flow greater than a second threshold, the second threshold less than the first threshold and greater than a third threshold. In other examples, method 400 may judge to open the turbocharger compressor bypass valve in response to air flow through the turbocharger compressor and pressure ratio across the turbocharger compressor being within a threshold flow and pressure ratio of a compressor surge line. In still other examples, method 400 may open the turbocharger compressor bypass valve in response to a decrease in accelerator pedal position greater than a second threshold, less than the first accelerator pedal position threshold, or other conditions. If method 400 judges to open the turbocharger compressor bypass valve, the answer is yes and method 400 proceeds to 422. Otherwise, the answer is no and method 400 proceeds to 424.

At 422, method 400 opens the turbocharger compressor bypass valve. The turbocharger compressor valve may be held open until conditions indicate that the turbocharger is not operating near surge conditions. For example, method 400 may hold the turbocharger compressor valve open until flow through the turbocharger compressor and pressure ratio across the turbocharger compressor are a threshold away from conditions that indicate compressor surge. By opening the turbocharger compressor bypass valve, the possibility of turbocharger compressor surge may be reduced via reducing the pressure ratio across the turbocharger compressor and increasing air flow through the turbocharger compressor. Method 400 proceeds to exit after the turbocharger bypass valve is closed.

At 424, method 400 closes the turbocharger compressor bypass valve. The turbocharger compressor bypass valve is closed to increase efficiency of the turbocharger compressor so that it may increase air flow to the engine if requested to do so. Method 400 proceeds to exit after the turbocharger compressor bypass valve is closed.

At 430, method 400 judges whether or not turbocharger lag or delay conditions are present. Conditions for turbocharger lag may be present when turbocharger compressor speed is lower than a threshold speed and when driver demand torque is higher than a threshold and/or increasing. The turbocharger may not be able to instantaneously increase engine air flow in response to an increase in driver demand torque when turbocharger compressor speed is low due to turbocharger inertia and air flow delays through the engine. If method 400 judges that turbocharger lag conditions are present, the answer is yes and method 400 proceeds to 432. Otherwise, the answer is no and method 400 proceeds to 440.

At 432, method 400 closes the turbocharger compressor bypass valve and the electrically driven compressor or supercharger bypass valve. By closing the turbocharger compressor bypass valve, all flow from the turbocharger compressor may be directed to or around the electrically driven compressor. Alternatively, the turbocharger compressor bypass valve may be initially open and then closed in response to flow through the turbocharger compressor being greater than a threshold so that air flow may be drawn past the turbocharger compressor until flow through the turbocharger compressor is sufficient to reduce the possibility of a pressure drop in the engine intake upstream of the turbocharger compressor. The electrically driven compressor bypass valve is closed to pressurize air downstream of the electrically driven compressor.

At 434, method 400 activates the electrically driven compressor (ES) by supplying current and/or voltage to the electrically driven compressor. The electrically driven compressor speed is increased to a value that is based on the desired engine air flow and pressure at the throttle inlet. By activating the electrically driven compressor, air may be provided to the engine at a faster rate than if only the turbocharger was present along the engine intake passage. Method 400 proceeds to exit after activating the electrically driven compressor.

At 440, method 400 closes the turbocharger compressor bypass valve if it is open and opens the electrically driven compressor bypass valve if it is closed. By closing the turbocharger compressor bypass valve, turbocharger air flow to the engine may be increased as compared to if the turbocharger compressor bypass valve is open. Further, by opening the electrically driven compressor bypass valve, air flow from the turbocharger compressor to the throttle may be increased. Method 400 proceeds to 442 after the turbocharger compressor bypass valve is closed and the electrically driven compressor bypass valve is opened.

At 442, method 400 deactivates the electrically driven compressor or supercharger. By deactivating the electrically driven compressor, electrical energy may be conserved. Further, since turbocharger delay conditions are not present, increases in engine air flow may be provided solely by the turbocharger compressor without operating the electrically driven compressor. Method 400 proceeds to 444 after deactivating the electrically driven compressor.

At 444, method 400 provides boost (e.g., pressurized air) to the engine via the turbocharger without assistance from the electrically driven compressor or supercharger. Method 400 proceeds to exit after boost is provided to the engine via the electrically driven compressor.

In this way, pressure oscillations in the engine intake system may be reduced via an electrically driven compressor being operated in concert with a turbocharger compressor that is driven via exhaust gases. Further, the electrically driven compressor may be activated in response to pressure oscillations in the engine intake are higher than a threshold. However, when pressure oscillations are lower than the threshold, it may be more efficient to open the turbocharger compressor bypass valve. Further, it may be desirable to open the turbocharger compressor bypass valve instead of activating the electrically driven compressor if compressor speed is higher than a threshold where a threshold engine air flow may be provided in less than a threshold amount of time.

Thus, the method of FIG. 4 provides for a method for operating engine compressors, comprising: receiving sensor data to a controller; and activating a second compressor in an engine intake via the controller in response to a first compressor being within a threshold air flow of a surge condition based on the sensor data. The method includes where the second compressor is activated from a deactivated state, and further comprising adjusting a speed of the second compressor to provide a pressure at an output of the second compressor that is 180 degrees out of phase of a pressure at an output of the first compressor. The method includes where the sensor data includes a pressure ratio across the first compressor. The method includes where the sensor data includes air flow through the first compressor and further comprising adjusting a speed of the second compressor based on a position of a compressor bypass valve of the first compressor.

In some examples, the method includes where the first compressor is positioned along the engine air intake upstream of the second compressor. The method includes where the second compressor is an electrically driven compressor. The method includes where the second compressor is controlled to a speed based on a pressure in the engine intake.

The method of FIG. 4 also provides for a method for operating engine compressors, comprising: receiving sensor data to a controller; and adjusting air flow through a second compressor in an engine intake via the controller in response to a first compressor being within a threshold air flow of a surge condition based on the sensor data. The method includes where adjusting air flow through the second compressor includes commanding air flow through the second compressor based on a predetermined desired air flow based on surge conditions of the first compressor. The method includes where the surge condition is a speed oscillation of the first compressor. The method includes where adjusting air flow through the second compressor includes commanding air flow through the second compressor based on pressure or air flow data provided via a sensor.

In some examples, the method includes where adjusting air flow through the second compressor includes decreasing pressure at an outlet of the second compressor in response to an increase pressure at an outlet of the first compressor. The method also includes where adjusting air flow through the second compressor includes increasing pressure at an outlet of the second compressor in response to a decrease in pressure at an outlet of the first compressor. The method further comprises closing a bypass valve of the second compressor in response to the first compressor being within a threshold air flow of the surge condition.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating engine compressors, comprising:
   receiving sensor data to a controller;
   activating a second compressor in an engine intake via the controller in response to a first compressor being within a threshold air flow of a surge condition based on the sensor data, where the second compressor is activated from a deactivated state; and
   adjusting a speed of the second compressor to provide a pressure at an output of the second compressor that is 180 degrees out of phase of a pressure at an output of the first compressor.

2. The method of claim 1, where the sensor data includes a pressure ratio across the first compressor, and further comprising adjusting a speed of the second compressor based on a position of a compressor bypass valve of the first compressor.

3. The method of claim 1, where the sensor data includes air flow through the first compressor.

4. The method of claim 1, where the first compressor is positioned along the engine air intake upstream of the second compressor.

5. The method of claim 1, where the second compressor is an electrically driven compressor.

6. The method of claim 1, where the second compressor is controlled to a speed based on a pressure in the engine intake.

7. A method for operating engine compressors, comprising:
   receiving sensor data to a controller;
   activating a second compressor in an engine intake via the controller in response to a first compressor being within a threshold air flow of a surge condition based on the sensor data, where the sensor data includes a pressure ratio across the first compressor; and
   adjusting a speed of the second compressor based on a position of a compressor bypass valve of the first compressor.

8. A method for operating engine compressors, comprising:
   receiving sensor data to a controller;
   adjusting air flow through a second compressor in an engine intake via the controller in response to a first compressor being within a threshold air flow of a surge condition based on the sensor data; and
   closing a bypass valve of the second compressor in response to the first compressor being within a threshold air flow of the surge condition.

9. The method of claim 8, where adjusting air flow through the second compressor includes commanding air flow through the second compressor based on a predetermined desired air flow based on surge conditions of the first compressor.

10. The method of claim 8, where the surge condition is a speed oscillation of the first compressor.

11. The method of claim 8, where adjusting air flow through the second compressor includes commanding air flow through the second compressor based on pressure or air flow data provided via a sensor.

12. The method of claim 8, where adjusting air flow through the second compressor includes decreasing pressure at an outlet of the second compressor in response to an increase pressure at an outlet of the first compressor.

13. The method of claim 8, where adjusting air flow through the second compressor includes increasing pressure at an outlet of the second compressor in response to a decrease in pressure at an outlet of the first compressor.

14. An engine system, comprising:
an engine including an air intake;
an exhaust gas driven compressor positioned along the air intake and including a bypass valve;
an electrically driven compressor posited along the air intake downstream of the exhaust gas driven compressor; and
a controller including non-transitory instructions to open the bypass valve in response to a first indication of impending surge of the exhaust gas driven compressor and to activate the electrically driven compressor while the bypass valve is closed in response to a second indication of impending surge of the exhaust gas driven compressor.

15. The engine system of claim 14, where the first indication of impending surge occurs at a first turbocharger compressor flow that is less than a second turbocharger compressor flow where the second indication of impending surge occurs.

16. The engine system of claim 15, further comprising additional non-transitory instructions to adjust air flow through the electrically driven compressor in response to the second indication of impending surge.

17. The engine system of claim 16, where adjusting air flow through the electrically driven compressor includes commanding air flow through the electrically driven compressor based on pressure or air flow data provided via a sensor.

18. The engine system of claim 14, where the second compressor is activated from a deactivated state.

19. The engine system of claim 14, where the first and second indications of impending surge are based on an expected speed oscillation of the exhaust gas driven compressor.

* * * * *